(12) United States Patent
Yeh

(10) Patent No.: US 10,001,928 B2
(45) Date of Patent: Jun. 19, 2018

(54) MEMORY MANAGEMENT METHOD, MEMORY CONTROL CIRCUIT UNIT AND MEMORY STORAGE DEVICE

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days. days.

(21) Appl. No.: 15/390,547

(22) Filed: Dec. 26, 2016

(65) Prior Publication Data

US 2018/0129414 A1 May 10, 2018

(30) Foreign Application Priority Data

Nov. 7, 2016 (TW) .............................. 105136154 A

(51) Int. Cl.
*G06F 3/06* (2006.01)
*G06F 12/02* (2006.01)

(52) U.S. Cl.
CPC ............ *G06F 3/061* (2013.01); *G06F 3/0655* (2013.01); *G06F 3/0679* (2013.01); *G06F 12/0246* (2013.01); *G06F 2212/7201* (2013.01)

(58) Field of Classification Search
CPC ...... G06F 3/061; G06F 3/0619; G06F 3/0632; G06F 3/0644; G06F 3/0685
USPC .... 711/103, 154, 202, 206, 221; 365/185.33
See application file for complete search history.

(56) References Cited

U.S. PATENT DOCUMENTS

| | | | | |
|---|---|---|---|---|
| 6,532,528 B1 * | 3/2003 | Nishimoto | .......... | G06F 12/1027 711/200 |
| 7,451,264 B2 * | 11/2008 | Yero | .................. | G06F 12/0246 365/185.33 |
| 7,467,253 B2 * | 12/2008 | Yero | .................. | G06F 12/0246 365/185.29 |
| 7,596,656 B2 * | 9/2009 | Elhamias | ............ | G06F 12/0246 711/103 |
| 7,624,248 B1 * | 11/2009 | Wentzlaff | ............ | G06F 13/4022 711/135 |
| 7,962,715 B2 * | 6/2011 | Ware | .................. | G06F 12/0292 711/112 |

(Continued)

FOREIGN PATENT DOCUMENTS

TW 1506430 11/2015

*Primary Examiner* — Stephen Elmore
(74) *Attorney, Agent, or Firm* — JCIPRNET

(57) ABSTRACT

A memory management method, a memory control circuit unit and a memory storage device are provided, wherein the memory storage device includes a rewritable non-volatile memory module and a buffer memory. The method includes: loading at least one first address information of at least one first logical-physical mapping table from the rewritable non-volatile memory module to a first buffer area when the memory storage device is operated in a first mode, wherein the first address information has a first data quantity; and loading at least one second address information of at least one second logical-physical mapping table from the rewritable non-volatile memory module to the first buffer area when the memory storage device is operated in a second mode, wherein the second address information has a second data quantity, and the first data quantity is less than the second data quantity.

21 Claims, 7 Drawing Sheets

(56) References Cited

U.S. PATENT DOCUMENTS

| | | | | |
|---|---|---|---|---|
| 8,271,745 B2* | 9/2012 | Ware | ............. | G06F 12/0292 |
| | | | | 711/103 |
| 8,397,010 B1* | 3/2013 | Venkatramani | ..... | G06F 12/0607 |
| | | | | 711/150 |
| 8,583,851 B2* | 11/2013 | Venkatramani | ..... | G06F 12/0607 |
| | | | | 711/150 |
| 8,595,413 B2* | 11/2013 | Shima | ............ | G06F 12/0246 |
| | | | | 711/103 |
| 2003/0200402 A1* | 10/2003 | Willman | ............ | G06F 12/145 |
| | | | | 711/154 |
| 2005/0262292 A1* | 11/2005 | Kozakai | ............ | G06F 3/0614 |
| | | | | 711/103 |
| 2007/0156949 A1* | 7/2007 | Rudelic | ............ | G06F 9/4401 |
| | | | | 711/103 |
| 2011/0040931 A1* | 2/2011 | Shima | ............ | G06F 12/0246 |
| | | | | 711/103 |
| 2013/0332653 A1* | 12/2013 | Yeh | ............ | G06F 12/0246 |
| | | | | 711/103 |
| 2014/0156964 A1 | 6/2014 | Choi | | |
| 2014/0164680 A1* | 6/2014 | Lai | ............ | G06F 3/0679 |
| | | | | 711/103 |
| 2017/0322727 A1* | 11/2017 | Yeh | ............ | G06F 3/061 |

\* cited by examiner

MEMORY MANAGEMENT METHOD, MEMORY CONTROL CIRCUIT UNIT AND MEMORY STORAGE DEVICE

CROSS-REFERENCE TO RELATED APPLICATION

This application claims the priority benefit of Taiwan application serial no. 105136154, filed on Nov. 7, 2016. The entirety of the above-mentioned patent application is hereby incorporated by reference herein and made a part of this specification.

BACKGROUND

Technical Field

The present invention relates to a memory management method, and more particularly, to a memory management method for a rewritable non-volatile memory module, a memory control circuit unit and a memory storage device.

Description of Related Art

The growth of digital cameras, mobile phones, and MP3 players has been rapid in recent years. Consequently, the consumers' demand for storage media has increased tremendously. A rewritable non-volatile memory is one of the most adaptable memories for portable electronic products such as laptop computer due to its data non-volatility, low power consumption, small volume, non-mechanical structure and high read/write speed. A solid state drive (SSD) is a memory storage device which utilizes a flash memory module as a storage medium. For these reasons, flash memories have become an import part of the electronic industries.

The memory storage device using a rewritable non-volatile memory module as a storage medium is generally recorded with a mapping relation between logical addresses and physical erasing units so a host system can successfully access data in the rewritable non-volatile memory module. Specifically, a memory management circuit in the memory storage device stores one or more logical-physical mapping tables for recording mapping information between the logical addresses and the physical erasing units (or between the logical addresses and physical programming units) in the rewritable non-volatile memory module. Also, the memory management circuit further creates address information of the logical-physical mapping tables. For example, the address information can indicate the logical address of each logical-physical mapping table and physical erasing units mapped thereto. When intending to access the data, the memory management circuit loads the address information of the logical-physical mapping tables and the corresponding logical-physical mapping tables to a buffer memory, and writes or reads the data according to the address information of the logical-physical mapping tables and the corresponding logical-physical mapping tables.

Generally, in order to ensure an execution efficiency when the host system performs an access (test) operation for small range data on the memory storage device, a space large enough to store all the address information of the logical-physical mapping tables and the logical-physical mapping tables corresponding to the small range data is usually preserved in the buffer memory so the memory management circuit does not need to frequently load the address information of the logical-physical mapping tables and the logical-physical mapping tables from the rewritable non-volatile memory module. Nonetheless, under such circumstance, if the host system performs an overall test operation for random read data instead, a range of the logical addresses corresponding to the random read data in the overall test operation will be wider than a range of the logical addresses corresponding to the small range data. Therefore, the space of the buffer memory preserved for all the address information of the logical-physical mapping tables and the logical-physical mapping tables corresponding to the small range data is unable to serve as a space required for the address information of the logical-physical mapping tables and the logical-physical mapping tables in the overall test operation for the random read data.

If the goal is to avoid loading the address information of the logical-physical mapping tables and the logical-physical mapping tables for each of the two data access (or test) operations, a space large enough to store the address information of the logical-physical mapping tables and the logical-physical mapping tables corresponding to the data having a capacity equal to a capacity of the memory storage device must be preserved in the buffer memory; however, as a result, the space of the buffer memory cannot be fully utilized in certain cases (e.g., the access operation for the small range data), which leads to wastes of the space of the buffer memory. Accordingly, finding a way to improve speed and performance of the memory storage device during the data access (or test) operations while properly distributing and utilizing the space of the buffer memory is the challenge for persons skilled in the art.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a memory management method, a memory control circuit unit and a memory storage device, which are capable of effectively distributing and utilizing the space of the buffer memory while improving speed and performance of the memory storage device during data access.

An exemplary embodiment of the invention provides a memory management method for a memory storage device. The memory storage device includes a rewritable non-volatile memory module and a buffer memory, and the buffer memory at least includes a first buffer area and a second buffer area. The memory management method includes: loading at least one first address information of at least one first logical-physical mapping table from the rewritable non-volatile memory module to a first buffer area when the memory storage device is operated in a first mode, wherein the first address information has a first data quantity; and loading at least one second address information of at least one second logical-physical mapping table from the rewritable non-volatile memory module to the first buffer area when the memory storage device is operated in a second mode, wherein the second address information has a second data quantity, and the first data quantity is less than the second data quantity.

An exemplary embodiment of the invention provides a memory control circuit unit, which is configured to control a rewritable non-volatile memory module. The memory control circuit unit includes a host interface, a memory interface, a buffer memory and a memory management circuit. The host interface is coupled to a host system. The memory interface is coupled to the rewritable non-volatile memory module. The buffer memory is coupled to the host interface and the memory interface. The memory management circuit is coupled to the host interface, the memory interface and the buffer memory. The memory management circuit is configured to load at least one first address information of at least one first logical-physical mapping table from the rewritable non-volatile memory module to the first buffer area when the memory storage device is operated in a first mode, where the first address information has a first data quantity. The memory management circuit is further configured to load at least one second address information of at least one second logical-physical mapping table from the rewritable non-volatile memory module to the first buffer area when the memory storage device is operated in a second mode, where the second address information has a second data quantity, and the first data quantity is less than the second data quantity.

An exemplary embodiment of the invention provides a memory storage device, which includes a connection interface unit, a rewritable non-volatile memory module and aforesaid memory control circuit unit. The connection interface unit is coupled to a host system, and the memory control circuit unit is coupled to the connection interface unit and the rewritable non-volatile memory module and includes a buffer memory. The memory control circuit unit is configured to load at least one first address information of at least one first logical-physical mapping table from the rewritable non-volatile memory module to the first buffer area when the memory storage device is operated in a first mode, where the first address information has a first data quantity. The memory control circuit unit is further configured to load at least one second address information of at least one second logical-physical mapping table from the rewritable non-volatile memory module to the first buffer area when the memory storage device is operated in a second mode, where the second address information has a second data quantity, and the first data quantity is less than the second data quantity.

Based on the above, by dynamically configuring the capacity of the buffer memory for temporarily storing the logical-physical mapping table and the address information thereof as described in aforesaid exemplary embodiments, an operational performance of the memory storage device may be improved when the host system performs the access (or test) operation for the small range data on the memory storage device as well as when the host system performs the overall test operation on the memory storage device. Accordingly, not only can the space of the buffer memory be effectively distributed and utilized, speed and performance of the memory storage device can also be improved during data access.

To make the above features and advantages of the invention more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
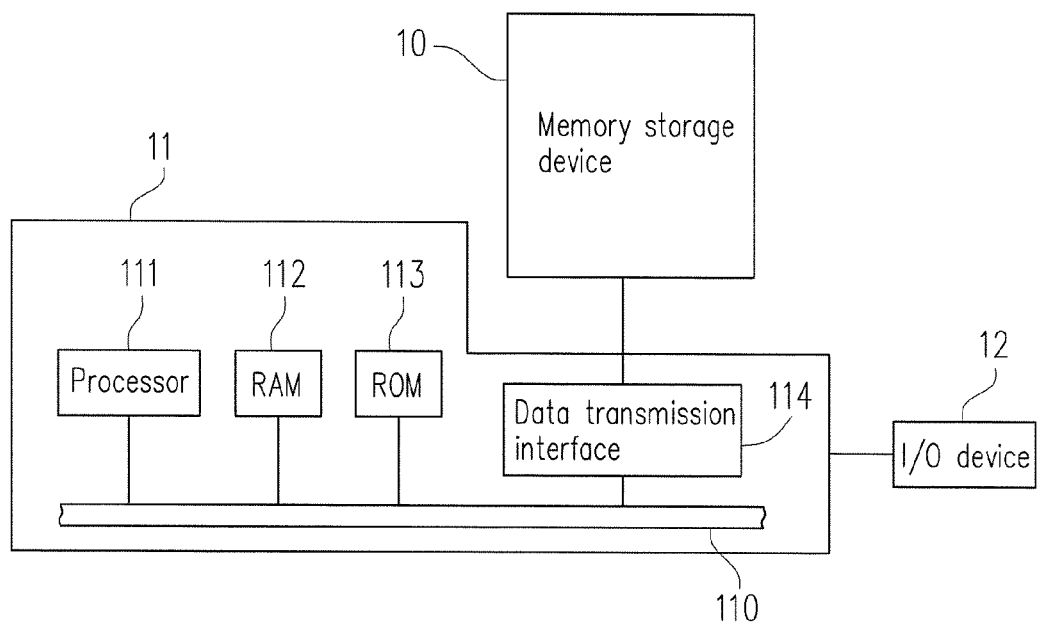
FIG. 1 is a schematic diagram illustrating a host system, a memory storage device and an I/O (input/output) device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also known as a memory storage system) includes a rewritable non-volatile memory module and a controller (also known as a control circuit). The memory storage device usually cooperates with a host system so the host system can write data into or read data from the memory storage device.

Figure 2:
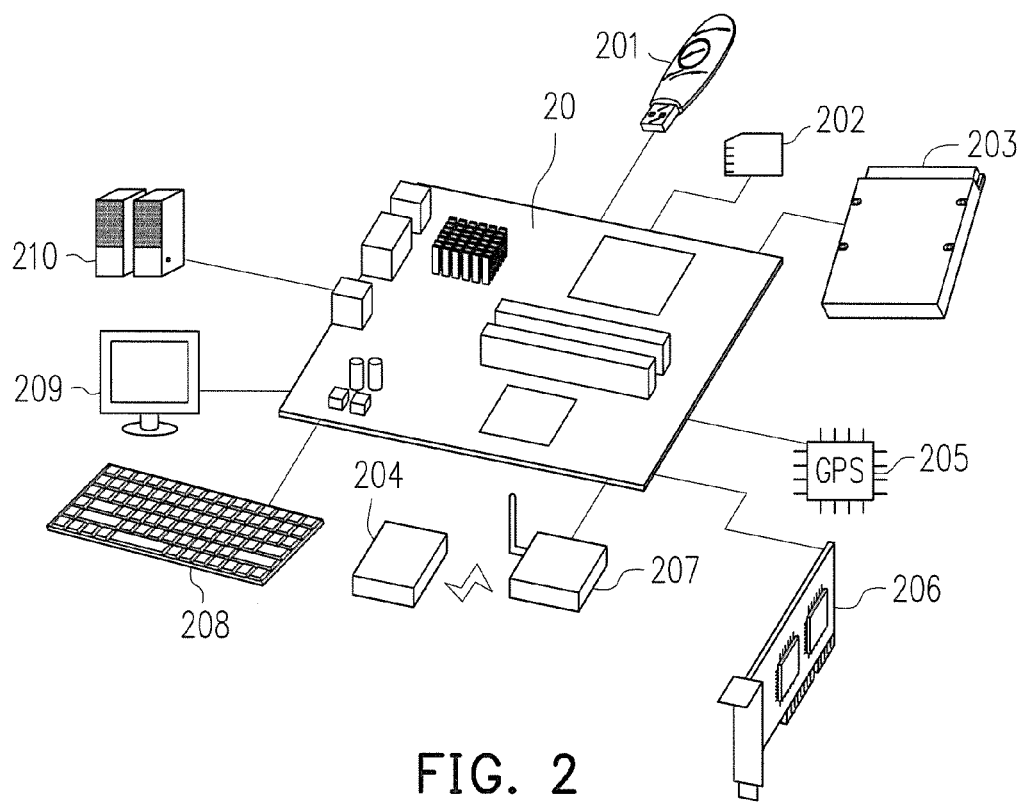
FIG. 2 is a schematic diagram illustrating a host system, a memory storage device and an I/O device according to another exemplary embodiment of the invention.

FIG. 1 is a schematic diagram illustrating a host system, a memory storage device and an I/O (input/output) device according to an exemplary embodiment of the invention. FIG. 2 is a schematic diagram illustrating a host system, a memory storage device and an I/O device according to another exemplary embodiment of the invention.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 can write data into the memory storage device 10 or read data from the memory storage device 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 via the system bus 110. For example, in an exemplary embodiment, the main board 20 can access the wireless memory storage device 204 via the wireless transmission device 207.

Figure 3:
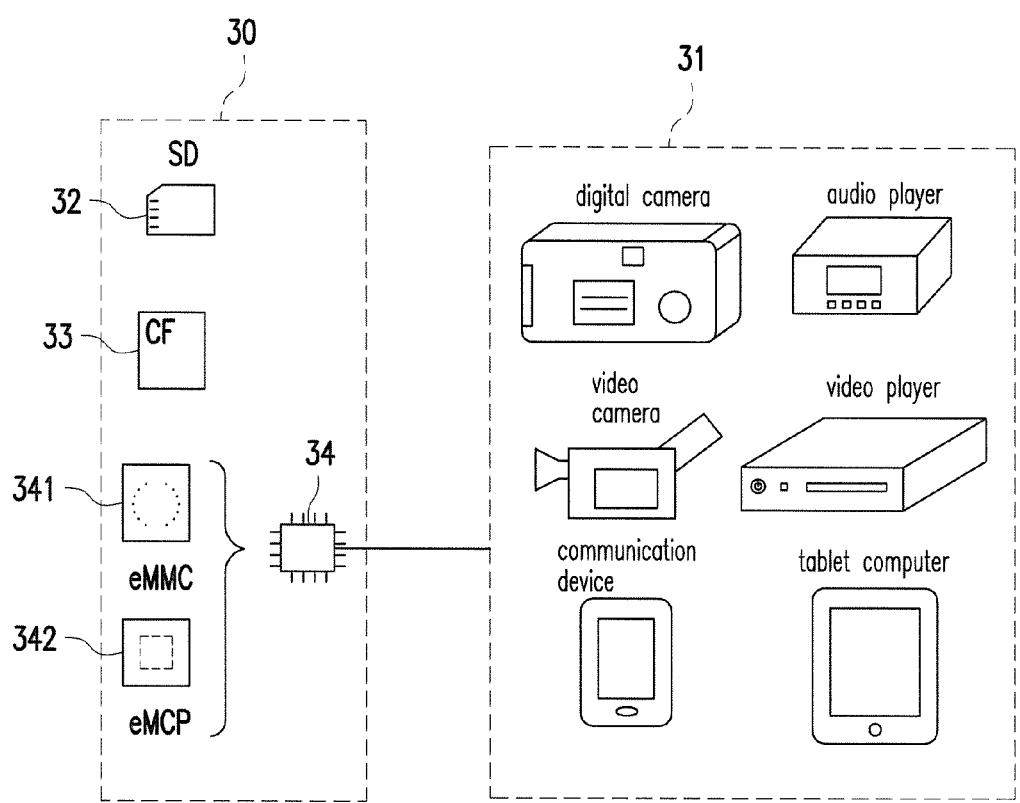
FIG. 3 is a schematic diagram illustrating a host system and a memory storage device according to another exemplary embodiment of the invention.

In an exemplary embodiment, aforementioned host system may be any system capable of substantially cooperating with the memory storage device for storing data. In the present exemplary embodiment, the host system is illustrated as a computer system. Nonetheless, FIG. 3 is a schematic diagram illustrating a host system and a memory storage device according to another exemplary embodiment of the invention. Referring to FIG. 3, in another exemplary embodiment, a host system 31 may also be a system including a digital camera, a video camera, a communication device, an audio player, a video player or a tablet computer, whereas a memory storage device 30 can be various non-volatile memory devices used by the host system, such as a SD card 32, a CF card 33 or an embedded storage device 34. The embedded storage device 34 includes various embedded storage devices capable of directly coupling a memory module onto a substrate of the host system, such as an eMMC (embedded MMC) 341 and/or an eMCP (embedded Multi Chip Package) 342.

Figure 4:
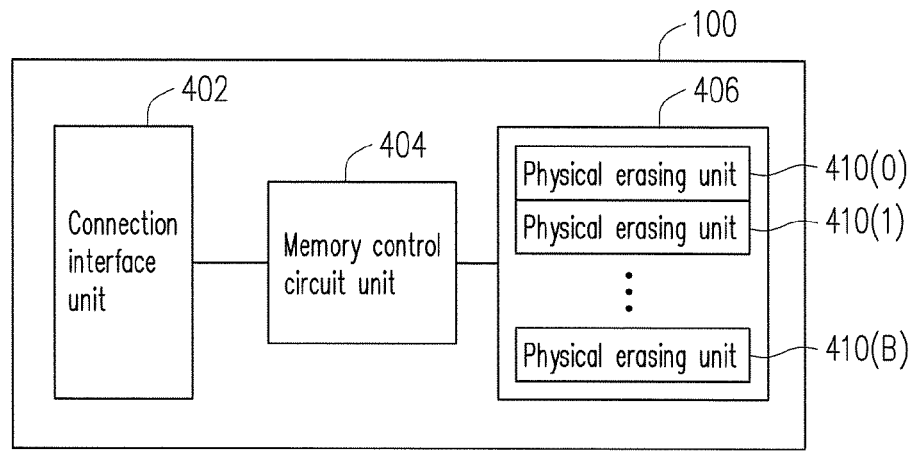
FIG. 4 is a schematic block diagram illustrating a memory storage device according to an exemplary embodiment of the invention.

FIG. 4 is a schematic block diagram illustrating a memory storage device according to an exemplary embodiment of the invention.

Referring to FIG. 4, the memory storage device 10 includes a connection interface unit 402, a memory control circuit unit 404 and a rewritable non-volatile memory module 406.

In the present exemplary embodiment, the connection interface unit 402 is compatible with a SATA (Serial Advanced Technology Attachment) standard. Nevertheless, it should be understood that the invention is not limited thereto. The connection interface unit 402 may also be compatible to a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD (Secure Digital) interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC (Embedded Multimedia Card) interface standard, a UFS (Universal Flash Storage) interface standard, an eMCP (embedded Multi Chip Package) interface standard, a CF (Compact Flash) interface standard, an IDE (Integrated Device Electronics) interface standard or other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form and perform operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features.

The rewritable non-volatile memory module 406 is coupled to the memory control circuit unit 404 and configured to store data written from the host system 11. The rewritable non-volatile memory storage module 406 includes multiple physical erasing units 410(0) to 410(B). For example, the physical erasing units 410(0) to 410(B) may belong to the same memory die or belong to different memory dies. Each physical erasing unit has a plurality of physical programming units, and the physical programming units of the same physical erasing unit may be written separately and erased simultaneously. Nevertheless, it should be understood that the invention is not limited thereto. Each physical erasing unit may be composed of 64 physical programming units, 256 physical programming units or any number of the physical programming units.

Figure 5:
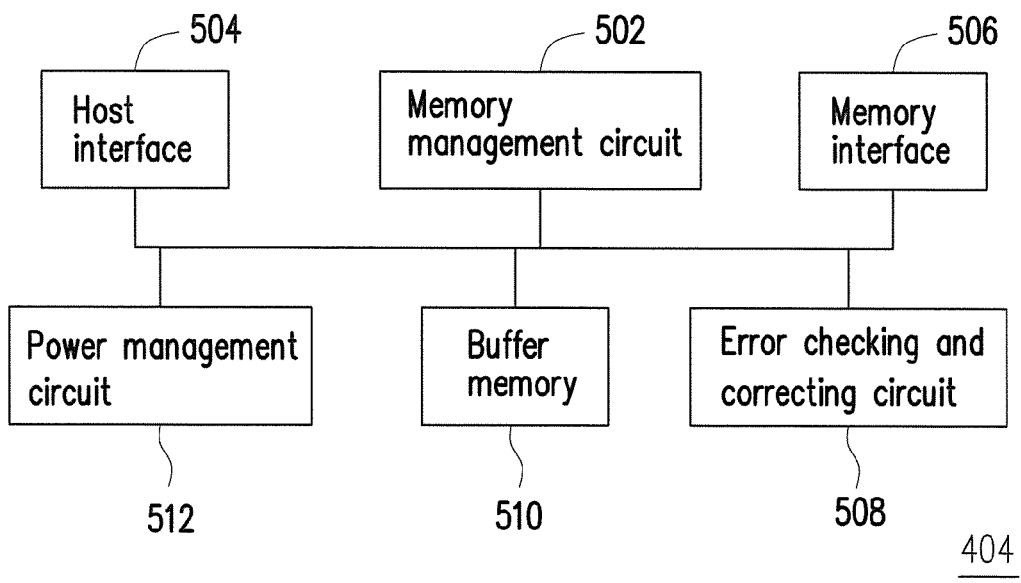
FIG. 5 is a schematic block diagram illustrating a memory control circuit unit according to an exemplary embodiment of the invention.

FIG. 5 is a schematic block diagram illustrating a memory control circuit unit according to an exemplary embodiment of the invention.

Referring to FIG. 5, the memory control circuit unit 404 includes a memory management circuit 502, a host interface 504 and a memory interface 506.

The memory management circuit 502 is configured to control overall operations of the memory control circuit unit 404. Specifically, the memory management circuit 502 has a plurality of control commands and the control commands are executed to perform various operations such as writing, reading and erasing data during operation of the memory storage device 10. Hereinafter, operations of the memory management circuit 502 are described as equivalent to describing operations of the memory control circuit unit 404.

In the present exemplary embodiment, the control commands of the memory management circuit 502 are implemented in form of firmware. For instance, the memory management circuit 502 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment, the control commands of the memory management circuit 502 may also be stored as program codes in a specific area (for example, the system area in a memory exclusively used for storing system data) of the rewritable non-volatile memory module 406. In addition, the memory management circuit 502 has a microprocessor unit (not illustrated), the read only memory (not illustrated) and a random access memory (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to perform operations, such as writing, reading or erasing data.

Further, in another exemplary embodiment, the control commands of the memory management circuit 502 may also be implemented in a form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of the rewritable non-volatile memory module 406 or a group thereof. The memory writing circuit is configured to give a write command sequence for the rewritable non-volatile memory module 406 in order to write data into the rewritable non-volatile memory module 406. The memory reading circuit is configured to give a read command sequence for the rewritable non-volatile memory module 406 in order to read data from the rewritable non-volatile memory module 406. The memory erasing circuit is configured to give an erase command sequence for the rewritable non-volatile memory module 406 in order to erase data from the rewritable non-volatile memory module 406. The data processing circuit is configured to process both the data to be written into the rewritable non-volatile memory module 406 and the data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 502 may further give command sequence of other types to the rewritable non-volatile memory module 406 for instructing to perform the corresponding operations.

The host interface 504 is coupled to the memory management circuit 502 and configured to receive and identify commands and data sent from the host system 11. In other words, the commands and data transmitted by the host system 11 are transmitted to the memory management circuit 502 via the host interface 504. In the present exemplary embodiment, the host interface 504 is compatible with the SATA standard. Nevertheless, it should be understood that the invention is not limited thereto. The host interface 504 may also compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence which instructs to write data, the read command sequence which instructs to read data, the erase command sequence which instructs to erase data, and other corresponding command sequences for instructing to perform various memory operations (e.g., changing read voltage levels or performing a garbage collection procedure). These command sequences are generated by the memory management circuit 502 and transmitted to the rewritable non-volatile memory module 406 through the memory interface 506, for example. The command sequences may include one or more signals, or data transmitted in the bus. The signals or the data may include command codes and program codes. For example, information such as identification codes and memory addresses are included in the read command sequence.

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to perform an error checking and correcting operation to ensure integrity of data. Specifically, when the memory management circuit 502 receives the write command from the host system 11, the error checking and correcting circuit 508 generates an ECC (error correcting code) and/or an EDC (error detecting code) for data corresponding to the write command, and the memory management circuit 502 writes data corresponding to the write command and the corresponding ECC and/or the EDC into the rewritable non-volatile memory module 406. Then, when the memory management circuit 502 reads the data from the rewritable non-volatile memory module 406, the corresponding ECC and/or the EDC are also read, and the error checking and correcting circuit 508 performs the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage device 10.

It is noted that in the following description, some terms may be replaced with corresponding abbreviations for ease of reading (see Table 1).

TABLE 1

| logical-physical mapping table | L-P Table |
| logical-to-physical mapping table | L2P table |
| physical-to-logical mapping table | P2L table |
| rewritable non-volatile memory module | RNVM module |
| physical unit | PU |
| physical erasing unit | PEU |
| physical programming unit | PPU |
| logical unit | LU |
| logical erasing unit | LEU |
| logical programming unit | LPU |
| memory management circuit | MMC |
| memory control circuit unit | MCCU |
| error checking and correcting circuit | ECCC |
| access command sequence | ACS |

Figure 6:
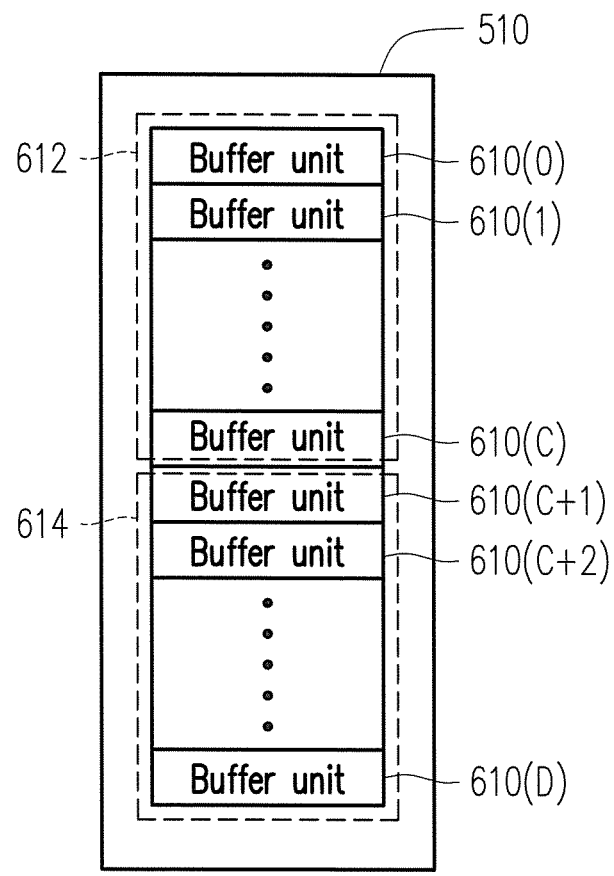
FIG. 6 is a schematic diagram illustrating a buffer memory according to an exemplary embodiment.

FIG. 6 is a schematic diagram illustrating a buffer memory according to an exemplary embodiment.

Referring to FIG. 6, the buffer memory 510 has buffer units 610(0) to 610(D), and a capacity of each buffer unit is, for example, 4 KB. Specifically, a capacity of four buffer units corresponds to a capacity of one PPU in the rewritable non-volatile memory. However, it should be understood that, the present exemplary embodiment is not intended to limit the number of the buffer units configured for the buffer memory 510, the capacity of the buffer unit and a size of data transmitted by the host system 11. Further, the host system 11 transmits or accesses data in 4 KB units, for example. Alternatively, in another exemplary embodiment, a data quantity transmitted or accessed each time by the host system 11 may also be greater than or less than 4 KB.

In the present exemplary embodiment, the memory cells of the RNVM module 406 constitute a plurality of PPUs, and the PPUs constitute a plurality of PEUs. For example, the memory cells on the same word line constitute one or more PPUs. If each of the memory cells can store more than one bit, the PPUs on the same word line can be at least classified into a lower PPU and an upper PPU. For instance, a least significant bit (LSB) of one memory cell belongs to the lower PPU, and a most significant bit (MSB) of one memory cell belongs to the upper PPU. Generally, in the MLC NAND flash memory, a writing speed of the lower PPU is higher than a writing speed of the upper PPU, and/or a reliability of the lower PPU is higher than a reliability of the upper PPU.

In the present exemplary embodiment, the PPU is the minimum unit for programming. That is, the PPU is the minimum unit for writing data. For example, the PPU is a physical page or a physical sector. When the PPUs are the physical page, these PPUs usually include a data bit area and a redundancy bit area. The data bit area includes multiple physical sectors configured to store user data, and the redundant bit area is configured to store system data (e.g., an error correcting code).

In the present exemplary embodiment, the data bit area includes 32 physical sectors, and a size of each physical sector is 512 bytes (B). However, in other exemplary embodiments, the data bit area may also include 8, 16 physical sectors or different number (more or less) of the physical sectors, and the size of each physical sector may also be greater or smaller. On the other hand, the PEU is the minimum unit for erasing. Namely, each PEU contains the least number of memory cells to be erased together. For instance, the PEU is a physical block.

Figure 7:
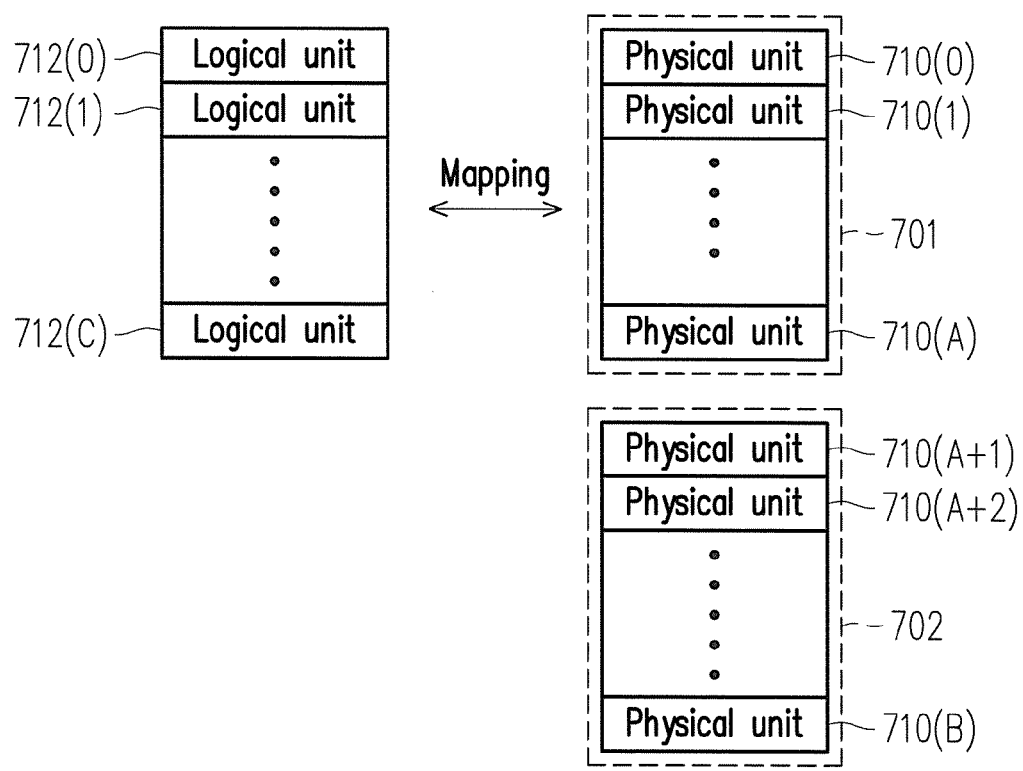
FIG. 7 is a schematic diagram illustrating management of a rewritable non-volatile memory module according to an exemplary embodiment of the invention.

FIG. 7 is a schematic diagram illustrating management of a rewritable non-volatile memory module according to an exemplary embodiment of the invention. It should be understood that terms, such as "select" and "group", are logical concepts which describe operations in the PUs of the RNVM module 406. That is to say, the PUs of the RNVM module 406 are logically operated while actual locations of the PUs of the RNVM module 406 remain unchanged.

Referring to FIG. 7, the MMC 502 logically groups the memory cells of the RNVM module 406 into PUs 710(0) to 710(B). In this exemplary embodiment, each PU in the PUs 710(0) to 710(B) refers to one or more PPUs. However, in another exemplary embodiment, each PU in the PUs 710(0) to 710(B) refers to one or more PEUs. For example, each PU in the PUs 710(0) to 710(B) is the PEUs 410(0) to 410(B).

In the present exemplary embodiment, the MMC 502 logically groups the PUs 710(0) to 710(B) into a storage area 701 and a spare area 702. The PUs 710(0) to 710(A) in the storage area 701 are stored with data, and the PUs 710(A+1) to 710(B) in the spare area 702 are not yet used for storing data. For example, each PU belonging to the storage area 701 may be stored with valid data and/or invalid data, and one PU belonging to the storage area 701 being erased is associated to the spare area 702. After one PU belonging to the storage area 701 is fully written, one specific PU is then selected from the spare area 702 and associated to the storage area 701 for storing other data.

In the present exemplary embodiment, the MMC 502 assigns LUs 712(0) to 712(C) for mapping to the PUs 710(0) to 710(A) in the storage area 701. In the present exemplary embodiment, the host system 11 accesses the data stored in the storage area 701 through a logical address (LA). Therefore, each of the LUs 712(0) to 712(C) refers to one logical address. Also, in the present exemplary embodiment, each LU among the LUs 712(0) to 712(C) is mapped to at least one of the PPUs. However, in another exemplary embodiment, each one of the LUs 712(0) to 712(C) may also refer to one LPU, one LEU or a composition of a plurality of continuous or non-continuous logical addresses.

Generally, the MMC 502 records a mapping relation (also known as a logical-physical mapping relation) between the LUs and the PUs into at least one L-P table, and creates address information of the L-P tables so as to record the logical address of each of the L-P tables and the PEU mapped thereto. When the host system 11 intends to read the data from the memory storage device 10 or write the data into the memory storage device 10, the MMC 502 can access the data in the memory storage device 10 according to the address information of the L-P tables and the L2P tables. For example, when the host system 11 gives a plurality of access commands to the MMC 502, the MMC 502 first loads the address information of the corresponding L-P tables to the buffer memory 510, and reads the corresponding L-P tables from the RNVM module 406 to the buffer memory according to the address information. Next, the MMC 502 can then read mapping information of the L-P tables so as to obtain logical addresses to be accessed by the access commands and obtain the PEUs or the PPUs mapped to the logical addresses. Then, the MMC 502 can perform an access operation for the data corresponding to the logical addresses on the RNVM module 406, so as to transmit the data to the host system 11 or to write the data into the PEUs or the PPUs of the RNVM module 406.

It should be noted that, in order to ensure an execution efficiency when the host system 11 performs an access (test) operation for small range data on the memory storage device 10, a space large enough to store all the address information of the L-P tables and the L-P tables corresponding to the small range data is usually preserved in the buffer memory 510 so the MMC 502 does not need to frequently load the address information of the L-P tables and the L-P tables from the RNVM module 406 to the buffer memory 510. For instance, referring back to FIG. 6, the buffer memory 510 is configured to at least include a buffer area 612 (also known as a first buffer area 612) and a buffer area 614 (also known as a second buffer area 614). The first buffer area 612 is a space configured to temporarily store the address information of the L-P tables, and the second buffer area 614 is a space configured to temporarily store the L-P tables. More specifically, assuming that a data quantity of said small range data is 1 GB (gigabytes), a data quantity of all the mapping information of the L-P tables for managing the data with the capacity of 1 GB is approximately 1 MB (megabyte), and a data quantity of the address information of the L-P tables for managing the L-P tables with the capacity of 1 MB is approximately 1 KB (kilobyte). Therefore, in the example where the host system 11 performs the access (or test) operation for the small range data on the memory storage device 10, a capacity of the first buffer area 612 must at least be configured as 1 KB, and a capacity of the second buffer area 614 must at least be configured as 1 MB. In this way, the MMC 502 does not need to load the address information of the L-P tables and the L-P tables from the RNVM module 406 to improve the operational performance of the memory storage device 10.

However, under such circumstance, if the host system 11 performs the overall test operation for the random read data on the memory storage device 10 instead, the range of the logical addresses corresponding to the random read data in the overall test operation will be wider than a range of the logical addresses corresponding to the small range data. For example, if a total capacity of the RNVM module 406 is 512 GB in the example where the host system 11 performs the overall test operation on the memory storage device, the capacity of the first buffer area 612 must at least be configured as a size enough to temporarily store the address information of the L-P tables of 512 KB, and the capacity of the second buffer area 614 must at least be configured as a size enough to temporarily store the L-P tables of 512 MB. Only by doing so, the MMC 502 can then be prevented from loading the address information of the L-P tables and the L-P tables from the RNVM module 406. Apparently, the first buffer area 612 of 1 KB and the second buffer area 614 of 1 MB specifically preserved for the small range data with the data quantity of 1 GB are unable to serve as the space required for storing the address information of the L-P tables and the L-P tables in the overall test operation for the random read data.

On the other hand, if the goal is to avoid loading the address information of the L-P tables and the L-P tables for each of the two data access (or test) operations, a space large enough (i.e., the first buffer area 612 of 512 KB and the second buffer area 614 of 512 MB) to manage the address information of the L-P tables and the L-P tables corresponding to the data having a capacity of the memory storage device 10 (e.g., 512 GB) must at least be preserved in the buffer memory 510; however, if the space with such a huge capacity (i.e., 512 MB) is configured as the second buffer area 614, the space of the buffer memory 510 cannot be fully used in certain cases (e.g., the access operation for the small range data), which leads to wastes of the space of the buffer memory 510.

Therefore, in the traditional approach, the first buffer area 612 will be configured as a fixed-capacity space enough to temporarily store the address information of the L-P tables of less capacity (e.g., 16 KB), and the second buffer area 614 will be configured as a fixed-capacity space enough to temporarily store the L-P tables with the capacity of 1 MB. By doing so, when performing the access (or test) operation for the small range data on the memory storage device, the host system 11 can access only the data corresponding to access commands from the RNVM module 406 according to all the L-P tables corresponding to the small range data pre-loaded to the second buffer area 614 of the buffer memory 510. In addition, when performing the overall test operation on the memory storage device, the host system 11 needs to load the address information of the L-P tables corresponding to the access commands from the RNVM module 406 to the first buffer area 612, load the L-P tables corresponding to the address information from the RNVM module 406 to the second buffer area 614 according to the address information of the L-P tables loaded to the first buffer area 612, and then access the data corresponding to the access commands from the RNVM module 406. Thus, in such traditional approach, it is obvious that the operational performance of the memory storage device 10 is unable to take both the two data access (or test) operations into consideration at the same time.

In light of the above, in the present exemplary embodiment, the MMC 502 dynamically arranges the capacity of the first buffer area 612 for temporarily storing the address information of the L-P tables and the capacity of the second buffer area 614 for temporarily storing the L-P tables according to an operation mode of the memory storage device 10, where a total capacity of the capacity of the first buffer area 612 and the capacity of the second buffer area 614 is a predetermined value. Herein, the total capacity of the RNVM module 406 is, for example, 512 GB, and the operation mode at least includes a first mode and a second mode. In the present exemplary embodiment, the first mode is, for example, the access (or test) operation for the small range data (e.g., data with the data quantity of 1 GB) performed on the memory storage device 10 by the host system 11, and the second mode is, for example, the overall test operation for a large range data (e.g., data with the data quantity of 512 GB) performed on the memory storage device 10. In other words, the memory storage device 10 processes data (also known as first data) having a data quantity (also known as a third data quantity) of 1 GB in the first mode. In the second mode, the memory storage device 10 processes data (also known as second data) having a data quantity (also known as a fourth data quantity) of 512 GB. Herein, the third data quantity is less than the fourth data quantity, and the fourth data quantity is the capacity of the RNVM module 406. In order to describe the memory management method and the operations of the MMC 502 of the invention more clearly, an example is provided below with reference to FIG. 8A and FIG. 8B.

Figure 8A:
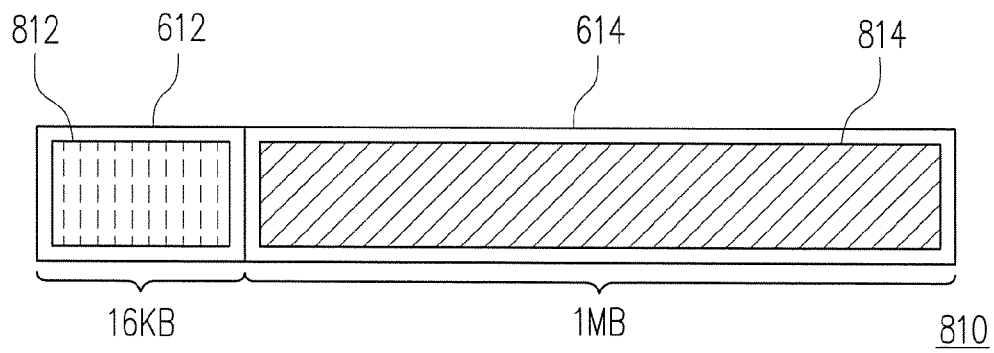
FIG. 8A is a schematic diagram illustrating a capacity configuration for the first buffer area and the second buffer area of the buffer memory in the first mode according to an exemplary embodiment of the invention.
Figure 8B:
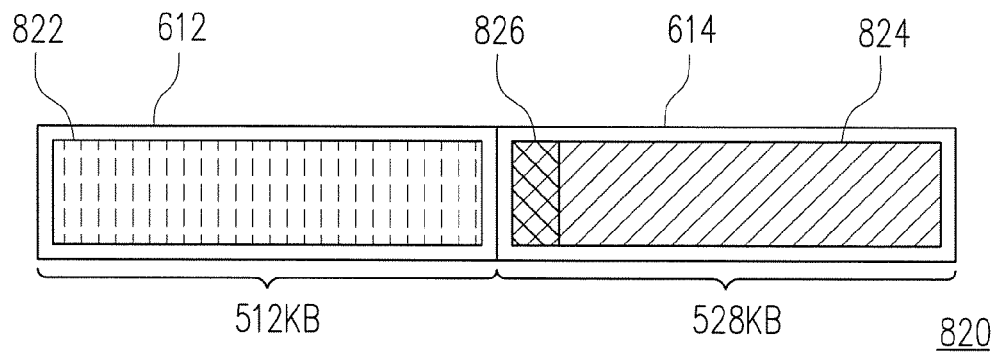
FIG. 8B is a schematic diagram illustrating a capacity configuration for the first buffer area and the second buffer area of the buffer memory in the second mode according to an exemplary embodiment of the invention.

FIG. 8A is a schematic diagram illustrating a capacity configuration for the first buffer area and the second buffer area of the buffer memory in the first mode according to an exemplary embodiment of the invention. FIG. 8B is a schematic diagram illustrating a capacity configuration for the first buffer area and the second buffer area of the buffer memory in the second mode according to an exemplary embodiment of the invention.

Referring to FIG. 8A, in the exemplary embodiments of the invention, the predetermined value (i.e., the total capacity of the capacity of the first buffer area 612 and the capacity of the second buffer area 614) is, for example, 1040 KB. The third data quantity of the first data processed by the memory storage device 10 in a first mode 810 is 1 GB and the capacity of the mapping information of the L-P tables (also known as first L-P tables) for managing the first data with the capacity of 1 GB is approximately 1 MB. Therefore, the MMC 502 configures the capacity of the second buffer area 614 as 1 MB and configures the capacity of the first buffer area 612 as 16 KB when the memory storage device 10 is operated in the first mode 810. Accordingly, the second buffer area 614 may then be used to store the first L-P tables corresponding to the first data. Specifically, when the MMC 502 determines that the memory storage device 10 is in the first mode 810, the MMC 502 loads address information 812 (also known as at least one first address information 812) of a part of the first L-P tables and all the first L-P tables 814 (i.e., all the L-P table of the first data) to the first buffer area 612 and the second buffer area 614 of the buffer memory 510, respectively. However, the invention is not limited thereto. For example, in another exemplary embodiment, when the MMC 502 determines that the memory storage device 10 is in the first mode, it is also possible that the MMC 502 does not pre-load the first address information 812 to the first buffer area 612 but only pre-loads all the first L-P tables 814 to the second buffer area 614.

Accordingly, when the MMC 502 receives a plurality of access commands (also known as first access commands) including a plurality of LUs (also known as first LUs) in the first mode 810, the MMC 502 can send an ACS (also known as a first ACS) corresponding to the first access commands to read the mapping information corresponding to the first LUs in the first L-P tables 814 temporarily stored in the second buffer area 614, and access data belonging to the first LUs from the RNVM module 406 according to the mapping information of the first LUs. In other words, in the present exemplary embodiment, when the memory storage device 10 is in the first mode 810, because all the first L-P tables 814 are temporarily stored to the second buffer area 614 already, the MMC 502 no longer needs to load the first L-P tables 814 from the RNVM module 406 to the buffer memory 510 when receiving the access commands. That is to say, the speed of the MMC 502 for performing the access operation corresponding one access command in the first mode 810 merely takes the equivalent time for loading or writing the data corresponding to the access commands from the RNVM module 406 to the buffer memory 510.

Referring to FIG. 8B, because the fourth data quantity of the second data processed by the memory storage device 10 in a second mode 820 is 512 GB, the capacity of the mapping information of the L-P tables (also known as second L-P tables) for managing the second data with the data quantity of 512 GB is approximately 512 MB and the capacity of address information for managing the second L-P tables with the capacity of 512 MB is approximately 512 KB, the MMC 502 configures the capacity of the first buffer area 612 as 512 KB and configures the capacity of the second buffer area 614 as 528 KB when the memory storage device 10 is operated in the second mode 820. Herein, the total capacity of the first buffer area 612 and the second buffer area 614 is aforementioned predetermined value (i.e., 1040 KB). Accordingly, the first buffer area 612 may then be used to store all the address information of the second L-P tables corresponding to the second data. Specifically, when the MMC 502 determines that the memory storage device 10 is in the second mode 820, the MMC 502 loads all the address information 822 (also known as second address information 822) of the second L-P tables and a part of the second L-P tables 824 from the RNVM module 406 to the first buffer area 612 and the second buffer area 614 of the buffer memory 510, respectively. However, the invention is not limited thereto. For example, in another exemplary embodiment, when the MMC 502 determines that the memory storage device 10 is in the second mode 820, it is also possible that the MMC 502 does not pre-load the part of the second L-P tables 824 to the second buffer area 614 but only pre-loads all the second address information 822 to the first buffer area 612.

Accordingly, when the MMC 502 receives a plurality of access commands (also known as second access commands) including a plurality of LUs (also known as second LUs) in the second mode 820, the MMC 502 sends an ACS (also known as a second ACS) corresponding to the second access commands to read the second address information 822 temporarily stored in the first buffer area 612, and read mapping information 826 corresponding to the access commands in the second L-P tables from the RNVM module 406 to the second buffer area 614 according to the second address information 822. Then, the MMC 502 can read the mapping information 826 corresponding to the second LUs in the second L-P tables from the second buffer area 614, and access data belonging to the second LUs from the RNVM module 406 according to the mapping information 826 of the second LUs. In other words, in the present exemplary embodiment, when the memory storage device 10 is in the second mode 820, because all the second address information 822 of the second L-P tables are temporarily stored in the first buffer area 612, the MMC 502 only needs to load the mapping information 826 in the second L-P tables corresponding to the access commands to the buffer memory 510 according to the second address information 822 when receiving the access commands. That is to say, a time of the MMC 502 for performing the access operation corresponding one access command in the second mode 820 merely takes the equivalent time for loading or writing the mapping information corresponding to the access commands and the data thereof from the RNVM module 406 to the buffer memory 510.

It should be noted that, when the MMC 502 receives the second access commands including the second LUs in the example where the memory storage device 10 is in the second mode 820, the MMC 502 can also determine whether the mapping information 826 corresponding to the second LUs is temporarily stored in the part of the second L-P table 824 temporarily stored in the second buffer area 614 first, so as to directly access the data belonging to the second LUs from the RNVM module 406 according to the mapping information 826 corresponding to the second LUs when the mapping information 826 corresponding to the second LUs is recorded in the part of the second L-P table 824 temporarily stored in the second buffer area 614. In this example, the time of the MMC 502 for performing the access operation corresponding one access command in the second mode 820 merely takes the equivalent time for loading or writing the data corresponding to the access commands from the RNVM module 406 to the buffer memory 510.

Referring back to FIG. 8A and FIG. 8B, in the exemplary embodiments of the invention, the MMC 502 dynamically arranges the capacity of the first buffer area 612 for temporarily storing the address information of the L-P tables and the capacity of the second buffer area 614 for temporarily storing the L-P tables according to the operation mode of the memory storage device 10 under the circumstance where the total capacity of the first buffer area 612 and the second buffer area 614 are the predetermined value. In view of FIG. 8A and FIG. 8B, a data quantity (also known as a first data quantity) included by the first address information 812 in the first mode 810 is less than a data quantity (also known as a second data quantity) included by the second address information 822 in the second mode 820. In addition, the capacity of the first buffer area 612 in the second mode 820 is not less than the capacity of the first buffer area 612 in the first mode 810, and the capacity of the second buffer area 614 in the second mode 820 is not greater than the capacity of the second buffer area 614 in the first mode 810. Further, the total capacity of the first buffer area 612 and the second buffer area 614 is a predetermined value in both the first mode 810 and the second mode 820. In particular, by configuring the capacity of the buffer memory 510 for storing the L-P tables and the address information thereof, the speed of the MMC 502 for performing the access operation corresponding to one access command in the first mode 810 can reach the same speed for loading or writing the data corresponding to the access commands from the RNVM module 406 to the buffer memory 510; and the speed of the MMC 502 for performing the access operation corresponding to one access command in the second mode 820 can at least reach the same speed for loading or writing the mapping information corresponding to the access commands and the data thereof from the RNVM module 406 to the buffer memory 510.

In the exemplary embodiments of the invention, if the speed of the MMC 502 for loading the address information of the L-P tables corresponding to the access commands, the mapping information corresponding to the access commands and the data thereof from the RNVM module 406 to the buffer memory 510 is, for example, 30 MB/s, the speed of the MMC 502 for loading or writing the mapping information corresponding to the access commands and the data thereof from the RNVM module 406 to the buffer memory 510 can reach, for example, 50 MB/s, and the speed of the MMC 502 for loading or writing the data corresponding to the access commands from the RNVM module 406 to the buffer memory 510 can reach, for example, 100 MB/s. In light of the above, in the present exemplary embodiment, the speed of the MMC 502 for performing the access operation corresponding to one access command is improved by 1.6 times to 3.3 times, as compared to the traditional approach. In addition, by dynamically configuring the capacity of the buffer memory 510 for storing the L-P tables and the address information, the operational performance of the memory storage device 10 may be improved when the host system 11 performs the access (or test) operation for the small range data on the memory storage device 10 as well as when the host system 11 performs the overall test operation on the memory storage device 10. In this way, the space of the buffer memory may be effectively distributed and utilized.

Figure 9:
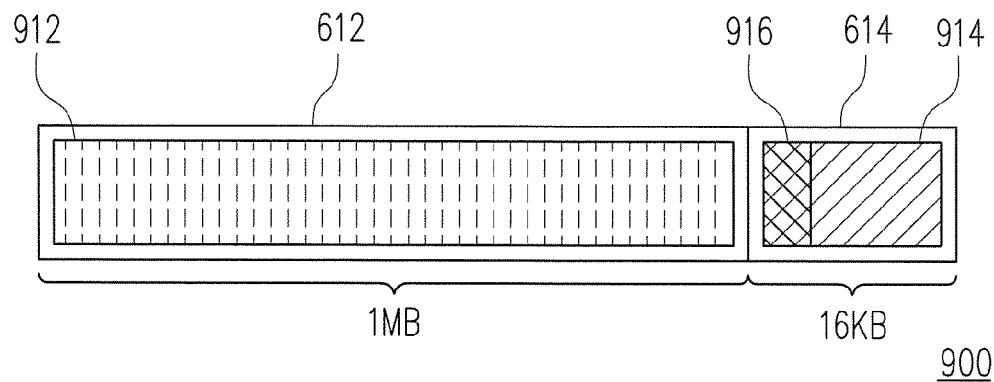
FIG. 9 is a schematic diagram illustrating a capacity configuration for the first buffer area and the second buffer area of the buffer memory in the second mode according to another exemplary embodiment of the invention.

FIG. 9 is a schematic diagram illustrating a capacity configuration for the first buffer area and the second buffer area of the buffer memory in the second mode according to another exemplary embodiment of the invention.

The foregoing exemplary embodiments are described using the total capacity of the RNVM module 406 being 512 GB an example. However, the total capacity of the RNVM module 406 is not particularly limited by the invention. For example, in the exemplary embodiments of the invention, the MMC 502 can further dynamically arrange the capacity of the first buffer area 612 for temporarily storing the address information of the L-P tables and the capacity of the second buffer area 614 for temporarily storing the L-P tables according to the total capacity of the RNVM module 406 and the operation mode of the memory storage device 10. Referring to FIG. 9, in the example where the total capacity of the RNVM module 406 is 1 TB (Terabyte), the capacity of the mapping information of L-P tables (also known as third L-P tables) for managing data (also known as third data) with the capacity of 1 TB is approximately 1 GB, and the capacity of the address information for managing the third L-P tables with the capacity of 1 GB is approximately 1 MB. Therefore, the MMC 502 configures the capacity of the first buffer area 612 as 1 MB and configures the capacity of the second buffer area 614 as 16 KB when the memory storage device 10 is operated in a second mode 900. Herein, the total capacity of the first buffer area 612 and the second buffer area 614 is aforementioned predetermined value (i.e., 1040 KB). Accordingly, the first buffer area 612 may then be used to store all the address information of all the third L-P tables corresponding to the third data. Similarly, when the MMC 502 determines that the memory storage device 10 is in the second mode 900, the MMC 502 loads all address information 912 (also known as third address information 912) of the third L-P tables and a part of third L-P tables 914 from the RNVM module 406 to the first buffer area 612 and the second buffer area 614, respectively. However, the invention is not limited thereto. For example, in another exemplary embodiment, when the MMC 502 determines that the memory storage device 10 is in the second mode 900, it is also possible that the MMC 502 does not pre-load the part of the third L-P tables 914 to the second buffer area 614 but only pre-loads all the third address information 912 to the first buffer area 612.

Next, when the MMC 502 receives a plurality of access commands (also known as third access commands) including a plurality of LUs (also known as third LUs) in the second mode 900, the MMC 502 sends an ACS (also known as a third ACS) corresponding to the third access commands to read the third address information 912 temporarily stored in the first buffer area 612, and read mapping information 916 corresponding to the access commands in the third L-P tables from the RNVM module 406 to the second buffer area 614 according to the third address information 912. Then, the MMC 502 can read the mapping information 916 corresponding to the third LUs in the third L-P tables from the second buffer area 614, and access data belonging to the third LUs from the RNVM module 406 according to the mapping information 916 of the third LUs. In other words, in the present exemplary embodiment, when the memory storage device 10 is in the second mode 900, because all the third address information 912 of the third L-P tables are temporarily stored in the first buffer area 612, the MMC 502 only needs to load the mapping information 916 in the third L-P tables corresponding to the access commands to the buffer memory 510 according to the third address information 912 when receiving the access commands. That is to say, a time of the MMC 502 for performing the access operation corresponding one access command in the second mode 900 merely takes the equivalent time for loading or writing the mapping information corresponding to the access commands and the data thereof from the RNVM module 406 to the buffer memory 510.

In particular, when the MMC 502 receives the third access commands including the third LUs in the example where the memory storage device 10 is in the second mode 900, the MMC 502 can also determine whether the mapping information 916 corresponding to the third LUs is temporarily stored in the part of the third L-P tables 914 temporarily stored in the second buffer area 614 first, so as to directly access the data belonging to the third LUs from the RNVM module 406 according to the mapping information 916 corresponding to the third LUs when the mapping information 916 corresponding to the third LUs is recorded in the part of the third L-P tables 914 temporarily stored in the second buffer area 614. In this example, the time of the MMC 502 for performing the access operation corresponding one access command in the second mode 900 merely takes the equivalent time for loading or writing the data corresponding to the access commands from the RNVM module 406 to the buffer memory 510.

Figure 10:
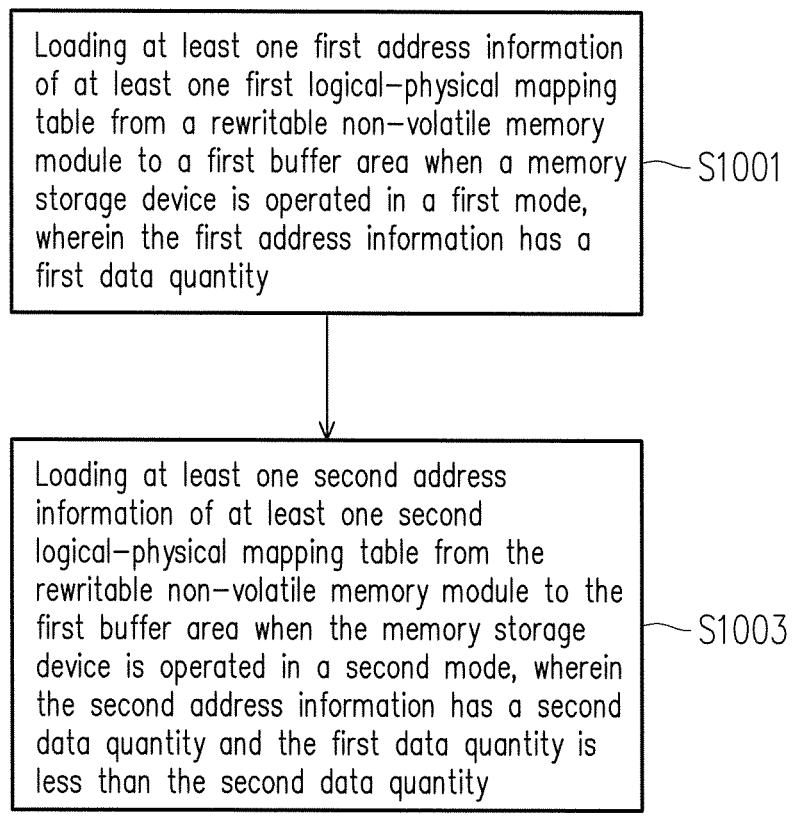
FIG. 10 is a flowchart illustrating a memory management method according to an exemplary embodiment of the invention.

FIG. 10 is a flowchart illustrating a memory management method according to an exemplary embodiment of the invention.

Referring to FIG. 10, in step S1001, the MMC 502 loads at least one first address information of at least one first L-P table from the RNVM module 406 to the first buffer area 612 when the memory storage device 10 is operated in a first mode, where the first address information has a first data quantity.

In step S1003, the MMC 502 loads at least one second address information of at least one second L-P table from the RNVM module 406 to the first buffer area 612 when the memory storage device 10 is operated in a second mode, where the second address information has a second data quantity and the first data quantity is less than the second data quantity.

Nevertheless, steps depicted in FIG. 10 are described in detail as above so that related description thereof is omitted hereinafter. It should be noted that, the steps depicted in FIG. 10 may be implemented as a plurality of program codes or circuits, which are not particularly limited in the invention. Moreover, the method disclosed in FIG. 10 may be implemented by reference with above exemplary embodiments, or may be implemented separately, which are not particularly limited in the invention.

In summary, the memory management method, the memory storage device and the MCCU proposed in the exemplary embodiments of the invention are capable of dynamically arranging the capacity of the first buffer area for temporarily storing the address information of the L-P tables and the capacity of the second buffer area for temporarily storing the L-P tables according to the operation mode of the memory storage device 10. In this way, the MMC does not need to perform the operation of loading the L-P tables and the address information thereof or the MMC can reduce the frequency of performing the operation of loading the L-P tables and the address information thereof, so the speed of the MMC for performing the access operation may be improved. In addition, with the operation of dynamically configuring the capacity of the buffer memory for storing the L-P tables and the address information according to the invention, the operational performance of the memory storage device 10 may be improved when the host system performs the access (or test) operation for the small range data on the memory storage device as well as when the host system performs the overall test operation on the memory storage device. As a result, not only can the space of the buffer memory be fully utilized to effectively save the space of the buffer memory, speed and performance of the memory storage device can also be improved during data access.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory management method for a memory storage device, wherein the memory storage device comprises a rewritable non-volatile memory module and a buffer memory, and the buffer memory at least comprises a first buffer area and a second buffer area, and the memory management method comprises:
   loading at least one first address information of at least one first logical-physical mapping table from the rewritable non-volatile memory module to the first buffer area when the memory storage device is operated in a first mode, wherein the first address information has a first data quantity; and
   loading at least one second address information of at least one second logical-physical mapping table from the rewritable non-volatile memory module to the first buffer area when the memory storage device is operated in a second mode, wherein the second address information has a second data quantity,
   wherein the first data quantity is less than the second data quantity.

2. The memory management method according to claim 1, wherein a total capacity of the first buffer area and the second buffer area is a predetermined value, and a capacity of the first buffer area in the second mode is not less than a capacity of the first buffer area in the first mode.

3. The memory management method of claim 2, wherein the memory storage device processes first data in the first mode and the first data has a third data quantity,
   wherein the memory storage device processes second data in the second mode and the second data has a fourth data quantity, wherein the third data quantity is less than the fourth data quantity,
   wherein the at least one first logical-physical mapping table is configured to record mapping information of the first data, and the at least one second logical-physical mapping table is configured to record mapping information of the second data.

4. The memory management method according to claim 2, further comprising:
   loading the at least one first logical-physical mapping table from the rewritable non-volatile memory module to the second buffer area when the memory storage device is operated in the first mode; and
   loading the at least one second logical-physical mapping table from the rewritable non-volatile memory module to the second buffer area when the memory storage device is operated in the second mode,
   wherein a capacity of the second buffer area in the second mode is not greater than a capacity of the second buffer area in the first mode.

5. The memory management method according to claim 4, wherein after loading the at least one first logical-physical mapping table from the rewritable non-volatile memory module to the second buffer area, the memory management method comprises:

receiving a plurality of first access commands, wherein the first access commands comprise a plurality of first logical units; and sending a first access command sequence corresponding to the first access commands, reading mapping information corresponding to the first logical units in the at least one first logical-physical mapping table from the second buffer area, and accessing data belonging to the first logical units from the rewritable non-volatile memory module according to the mapping information of the first logical units.

6. The memory management method according to claim 4, wherein after loading the at least one second logical-physical mapping table from the rewritable non-volatile memory module to the second buffer area, the memory management method comprises:

receiving a plurality of second access commands, wherein the second access commands comprise a plurality of second logical units; and sending a second access command sequence corresponding to the second access commands, reading mapping information corresponding to the second logical units in the at least one second logical-physical mapping table from the second buffer area, and accessing data belonging to the second logical units from the rewritable non-volatile memory module according to the mapping information of the second logical units.

7. The memory management method according to claim 2, wherein after loading the at least one second address information of the at least one second logical-physical mapping table from the rewritable non-volatile memory module to the first buffer area, the memory management method comprises:

receiving a plurality of second access commands, wherein the second access commands comprise a plurality of second logical units;

sending a second access command sequence corresponding to the second access commands, reading the second address information from the first buffer area, and reading the at least one second logical-physical mapping table from the rewritable non-volatile memory module to the second buffer area according to the second address information; and reading mapping information corresponding to the second logical units in the at least one second logical-physical mapping table from the second buffer area, and accessing data belonging to the second logical units from the rewritable non-volatile memory module according to the mapping information of the second logical units.

8. A memory control circuit unit for controlling a rewritable non-volatile memory module of a memory storage device, wherein the memory control circuit unit comprises:

a host interface, configured to couple to a host system;

a memory interface, configured to couple to the rewritable non-volatile memory module;

a buffer memory, coupled to the host interface and the memory interface, the buffer memory at least comprising a first buffer area and a second buffer area; and a memory management circuit, coupled to the host interface, the memory interface and the buffer memory, wherein the memory management circuit is configured to load at least one first address information of at least one first logical-physical mapping table from the rewritable non-volatile memory module to the first buffer area when the memory storage device is operated in a first mode, wherein the first address information has a first data quantity, wherein the memory management circuit is further configured to load at least one second address information of at least one second logical-physical mapping table from the rewritable non-volatile memory module to the first buffer area when the memory storage device is operated in a second mode, wherein the second address information has a second data quantity, wherein the first data quantity is less than the second data quantity.

9. The memory control circuit unit of claim 8, wherein a total capacity of the first buffer area and the second buffer area is a predetermined value, and a capacity of the first buffer area in the second mode is not less than a capacity of the first buffer area in the first mode.

10. The memory control circuit unit of claim 9, wherein the memory storage device processes first data in the first mode and the first data has a third data quantity, wherein the memory storage device processes second data in the second mode and the second data has a fourth data quantity, wherein the third data quantity is less than the fourth data quantity, wherein the at least one first logical-physical mapping table is configured to record mapping information of the first data, and the at least one second logical-physical mapping table is configured to record mapping information of the second data.

11. The memory control circuit unit of claim 9, wherein the memory management circuit is further configured to load the at least one first logical-physical mapping table from the rewritable non-volatile memory module to the second buffer area when the memory storage device is operated in the first mode, wherein the memory management circuit is further configured to load the at least one second logical-physical mapping table from the rewritable non-volatile memory module to the second buffer area when the memory storage device is operated in the second mode, wherein a capacity of the second buffer area in the second mode is not greater than a capacity of the second buffer area in the first mode.

12. The memory control circuit unit of claim 11, wherein after loading the at least one first logical-physical mapping table from the rewritable non-volatile memory module to the second buffer area, the memory management circuit is further configured to receive a plurality of first access commands, wherein the first access commands comprise a plurality of first logical units; and the memory management circuit is further configured to send a first access command sequence corresponding to the first access commands, read mapping information corresponding to the first logical units in the at least one first logical-physical mapping table from the second buffer area, and access data belonging to the first logical units from the rewritable non-volatile memory module according to the mapping information of the first logical units.

13. The memory control circuit unit of claim 11, wherein after loading the at least one second logical-physical mapping table from the rewritable non-volatile memory module to the second buffer area, the memory management circuit is further configured to receive a plurality of second access commands, wherein the second access commands comprise a plurality of second logical units; and the memory management circuit is further configured to send a second access command sequence corresponding to the second access commands, read mapping information corresponding to the second logical units in the at least one second logical-physical mapping table from the second buffer area, and access data belonging to the second logical units from the rewritable non-volatile memory module according to the mapping information of the second logical units.

14. The memory control circuit unit of claim 9, wherein after loading the at least one second address information of the at least one second logical-physical mapping table from the rewritable non-volatile memory module to the first buffer area,
the memory management circuit is further configured to receive a plurality of second access commands, wherein the second access commands comprise a plurality of second logical units;
the memory management circuit is further configured to send a second access command sequence corresponding to the second access commands, read the second address information from the first buffer area, and read the at least one second logical-physical mapping table from the rewritable non-volatile memory module to the second buffer area according to the second address information; and
the memory management circuit is further configured to read mapping information corresponding to the second logical units in the at least one second logical-physical mapping table from the second buffer area, and access data belonging to the second logical units from the rewritable non-volatile memory module according to the mapping information of the second logical units.

15. A memory storage device, comprising:
a connection interface unit, configured to couple to a host system;
a rewritable non-volatile memory module; and
a memory control circuit unit, coupled to the connection interface unit and the rewritable non-volatile memory module, wherein memory control circuit unit comprises a buffer memory, wherein the memory control circuit unit is configured to load at least one first address information of at least one first logical-physical mapping table from the rewritable non-volatile memory module to the first buffer area when the memory storage device is operated in a first mode, wherein the first address information has a first data quantity,
wherein the memory control circuit unit is further configured to load at least one second address information of at least one second logical-physical mapping table from the rewritable non-volatile memory module to the first buffer area when the memory storage device is operated in a second mode, wherein the second address information has a second data quantity,
wherein the first data quantity is less than the second data quantity.

16. The memory storage device according to claim 15, wherein a total capacity of the first buffer area and the second buffer area is a predetermined value, and a capacity of the first buffer area in the second mode is not less than a capacity of the first buffer area in the first mode.

17. The memory storage device according to claim 16, wherein the memory storage device processes first data in the first mode and the first data has a third data quantity, wherein the memory storage device processes second data in the second mode and the second data has a fourth data quantity, wherein the third data quantity is less than the fourth data quantity,
wherein the at least one first logical-physical mapping table is configured to record mapping information of the first data, and the at least one second logical-physical mapping table is configured to record mapping information of the second data.

18. The memory storage device according to claim 16, wherein the memory control circuit unit is further configured to load the at least one first logical-physical mapping table from the rewritable non-volatile memory module to the second buffer area when the memory storage device is operated in the first mode,
wherein the memory control circuit unit is further configured to load the at least one second logical-physical mapping table from the rewritable non-volatile memory module to the second buffer area when the memory storage device is operated in the second mode,
wherein a capacity of the second buffer area in the second mode is not greater than a capacity of the second buffer area in the first mode.

19. The memory storage device according to claim 18, wherein after loading the at least one first logical-physical mapping table from the rewritable non-volatile memory module to the second buffer area,
the memory control circuit unit is further configured to receive a plurality of first access commands, wherein the first access commands comprise a plurality of first logical units; and
the memory control circuit unit is further configured to send a first access command sequence corresponding to the first access commands, read mapping information corresponding to the first logical units in the at least one first logical-physical mapping table from the second buffer area, and access data belonging to the first logical units from the rewritable non-volatile memory module according to the mapping information of the first logical units.

20. The memory storage device according to claim 18, wherein after loading the at least one second logical-physical mapping table from the rewritable non-volatile memory module to the second buffer area,
the memory control circuit unit is further configured to receive a plurality of second access commands, wherein the second access commands comprise a plurality of second logical units; and
the memory control circuit unit is further configured to send a second access command sequence corresponding to the second access commands, read mapping information corresponding to the second logical units in the at least one second logical-physical mapping table from the second buffer area, and access data belonging to the second logical units from the rewritable non-volatile memory module according to the mapping information of the second logical units.

21. The memory storage device according to claim 16, wherein after loading the at least one second address information of the at least one second logical-physical mapping table from the rewritable non-volatile memory module to the first buffer area,
the memory control circuit unit is further configured to receive a plurality of second access commands, wherein the second access commands comprise a plurality of second logical units;
the memory control circuit unit is further configured to send a second access command sequence corresponding to the second access commands, read the second address information from the first buffer area, and read the at least one second logical-physical mapping table from the rewritable non-volatile memory module to the second buffer area according to the second address information; and the memory control circuit unit is further configured to read mapping information corresponding to the second logical units in the at least one second logical-physical mapping table from the second buffer area, and access data belonging to the second logical units from the rewritable non-volatile memory module according to the mapping information of the second logical units.

* * * * *